US010234844B2

(12) United States Patent
Tateno et al.

(10) Patent No.: US 10,234,844 B2
(45) Date of Patent: Mar. 19, 2019

(54) INFORMATION PROCESSING APPARATUS, CONTROL METHOD THEREOF, INFORMATION PROCESSING SYSTEM, AND NON-TRANSITORY COMPUTER-READABLE STORAGE MEDIUM

(71) Applicant: CANON KABUSHIKI KAISHA, Tokyo (JP)

(72) Inventors: Keisuke Tateno, Kawasaki (JP); Masahiro Suzuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 313 days.

(21) Appl. No.: 14/557,608

(22) Filed: Dec. 2, 2014

(65) Prior Publication Data

US 2015/0160651 A1    Jun. 11, 2015

(30) Foreign Application Priority Data

Dec. 9, 2013   (JP) .................. 2013-254486

(51) Int. Cl.
*G05B 19/418*   (2006.01)
*G05B 19/406*   (2006.01)

(52) U.S. Cl.
CPC .. *G05B 19/406* (2013.01); *G05B 2219/32179* (2013.01); *Y02P 90/22* (2015.11)

(58) Field of Classification Search
CPC ........ G05B 19/406; G05B 2219/32179; Y02P 90/22; G06T 7/0046
USPC ....................................................... 700/110
See application file for complete search history.

(56) References Cited

U.S. PATENT DOCUMENTS

| 6,141,863 A * | 11/2000 | Hara ...................... B25J 9/1633 29/714 |
| 7,868,904 B2 | 1/2011 | Morita et al. |
| 2005/0166413 A1 * | 8/2005 | Crampton .............. B25J 13/088 33/503 |
| 2008/0177411 A1 * | 7/2008 | Marsh .................. G06T 7/0006 700/110 |

(Continued)

FOREIGN PATENT DOCUMENTS

| JP | 2006-235699 A | 9/2006 |
| JP | 2008-170331 A | 7/2008 |

(Continued)

OTHER PUBLICATIONS

Roger Y. Tsai, "A Versatile Camera Calibration Technique for High-Accuracy 3D Machine Vision Metrology Using Off-the-Shelf TV Cameras and Lenses", Aug. 1987, pp. 323-344, vol. RA-3, No. 4, IEEE Journal of Robotics and Automation.

(Continued)

*Primary Examiner* — Mohammad Ali
*Assistant Examiner* — Joshua T Sanders
(74) *Attorney, Agent, or Firm* — Venable LLP

(57) ABSTRACT

An information processing apparatus comprises a position and orientation estimation unit configured to estimate each of positions and orientations of a first part and a second part, based on an image including the first part and the second part to which the first part is assembled; and a determination unit configured to determine assembly success/failure of the first part with respect to the second part based on each of the positions and orientations of the first part and the second part.

7 Claims, 6 Drawing Sheets

(56) References Cited

U.S. PATENT DOCUMENTS

| | | |
|---|---|---|
| 2010/0289797 A1 | 11/2010 | Tateno et al. |
| 2012/0113268 A1* | 5/2012 | Ito .................. H04N 5/2251 348/169 |
| 2012/0148100 A1* | 6/2012 | Kotake ............ G06T 7/0046 382/103 |
| 2012/0197438 A1* | 8/2012 | Ogami .............. B25J 9/1682 700/258 |
| 2013/0076865 A1 | 3/2013 | Tateno et al. |
| 2013/0197696 A1* | 8/2013 | Nammoto .......... B25J 9/1612 700/259 |
| 2013/0238128 A1 | 9/2013 | Suzuki |
| 2013/0245828 A1 | 9/2013 | Tateno et al. |

FOREIGN PATENT DOCUMENTS

| | | |
|---|---|---|
| JP | 2009-037392 A | 2/2009 |
| JP | 2010-528318 A | 8/2010 |
| WO | 2008/147355 A1 | 12/2008 |

OTHER PUBLICATIONS

Keisuke Tateno, Daisuke Kotake, and Shinji Uchiyama, "A Model Fitting Method Using Intensity and Range Images for Bin-Picking Applications", J94-D(8), 1410-1422, 2011, Journal of IEICE D, Information and System.

Takeshi Oishi, Atsushi Nakazawa, and Katsushi Ikeuchi, "Fast Simultaneous Alignment of Multiple Range Images Using Index Images", Mar. 2006, pp. 513-521, vol. J89-D No. 3, Journal of IEICE.

* cited by examiner

INFORMATION PROCESSING APPARATUS, CONTROL METHOD THEREOF, INFORMATION PROCESSING SYSTEM, AND NON-TRANSITORY COMPUTER-READABLE STORAGE MEDIUM

BACKGROUND OF THE INVENTION

Field of the Invention

The present invention relates to an information processing apparatus, a control method thereof, an information processing system, and a non-transitory computer-readable storage medium, and more particularly to a technique for determining whether a target part is gripped to assemble a part to be assembled to a predetermined position.

Description of the Related Art

Along with the recent development of robot technology, robots are doing complicated tasks, such as assembly of industrial products, which have been made by men. Such robots pick up and then assemble parts using end effectors such as hands. In the jobs of picking up parts and then assembling the parts by the robots, the assembly of parts may fail due to shifting of the position and orientation of the part and mixing of abnormal parts at the time of gripping the parts by hand mechanisms. For this reason, after the assembly of the parts, it is necessary to perform post-assembly inspections to check whether the parts are normally assembled. The post-assembly inspections have been generally performed by visual inspections by the assembly personnel. However, in recent years, an attempt aimed at automatic inspections has been started.

Japanese Patent Laid-Open No. 2008-170331 discloses a technique of capturing, in advance, a plurality of master images serving as the references of parts to be assembled, capturing a plurality of actual images at the time of actually assembling parts, obtaining correlation values between the master images and the actual images, and determining based on each correlation value whether the assembly of each part succeeds/fails.

In the technique disclosed in Japanese Patent Laid-Open No. 2008-170331, whether the assembly of each part succeeds/fails is determined depending on the comparison between the master image captured in advance at the time of learning and the captured image on a two-dimensional image. When the image of an inspection part is captured at an orientation different from that at the time of learning, it is impossible to perform appropriate determination.

The present invention has been made in consideration of the above problems, and provides a technique of stably determining whether assembly of a part succeeds/fails even when the image of an inspection part is captured at an orientation different from that at the time of learning.

SUMMARY OF THE INVENTION

According to one aspect of the present invention, there is provided an information processing apparatus comprising: a position and orientation estimation unit configured to estimate each of positions and orientations of a first part and a second part, based on an image including the first part and the second part to which the first part is assembled; and a determination unit configured to determine assembly success/failure of the first part with respect to the second part based on each of the positions and orientations of the first part and the second part.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment: Use Upon Defining Distance Between Portions of Interest of Two Parts as Assembly Evaluation Value <1. Outline of Processing>

This embodiment will exemplify a case in which an information processing apparatus is applied to a post-assembly inspection technique for determining whether assembly of two parts in the assembly step is normally performed.

Figure 2:
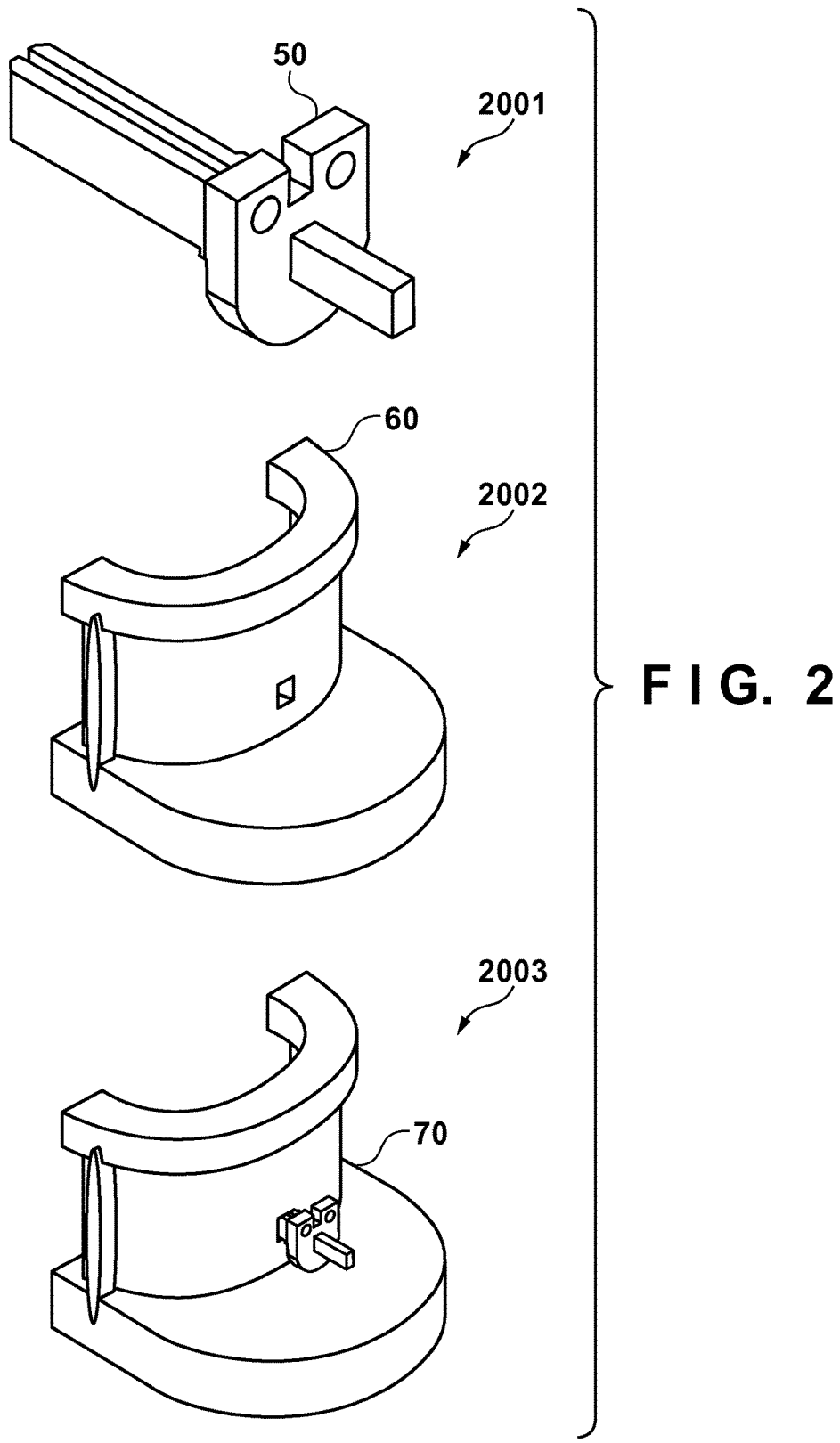
FIG. 2 shows examples of an assembly source part and an assembly destination part which serve as targets for determining whether assembly of parts succeeds/fails according to an embodiment of the present invention.

As a post-assembly inspection target according to this embodiment, an assembled part 70 formed from two parts, indicated as an example indicated by 2003 in FIG. 2 is assumed. The assembled part 70 includes an assembly source part 50 which is gripped and moved by a robot hand and indicated by 2001 in FIG. 2 and an assembly destination part 60 indicated by 2002 in FIG. 2. The post-assembly inspection in this embodiment is to determine whether assembly is performed appropriately based on the captured image of the assembled part 70. More specifically, when the contact portion between the assembly source part 50 and the assembly destination part 60 is shifted falling outside a predetermined range, the assembly is determined as a failure. If the shift falls within the predetermined range, the assembly is determined as the success. The "position and orientation" described in this embodiment means the relationship of the position and orientation of the assembly source part or the assembly destination part and a camera which captures its image part.

Figure 4:
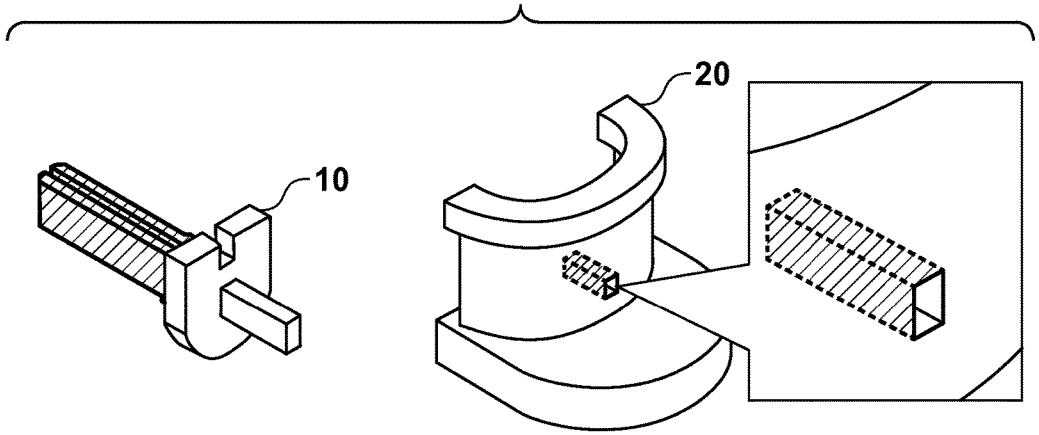
FIG. 4 is a view for explaining setting of an assembly contact portion to be set in the three-dimensional shape model according to an embodiment of the present invention.

The outline of processing of post-assembly inspection according to this embodiment will be briefly described. In the post-assembly inspection processing, three-dimensional shape models for the assembly source part 50 and the assembly destination part 60 are prepared. As indicated by the hatched portions in FIG. 4, portions serving as the contact surfaces in assembly are set as the portions of interest in the three-dimensional shape models. The three-dimensional positions and orientations of the assembly destination part 60 and the assembly source part 50 are calculated based on these three-dimensional shape models and the images obtained by capturing the assembled inspection target part. Based on the three-dimensional positions and orientations and the three-dimensional shape models, a three-dimensional distance between the assembly destination part 60 and the assembly source part 50 is calculated. If this distance is close to zero, the shift in position is determined to be small. For this reason, the three-dimensional distance between the portions of interest is used as an "assembly evaluation value". The assembly evaluation value is compared with an assembly evaluation value threshold to determine whether the assembly succeeds/fails.

The positions and orientations of the two assembled parts are estimated from the captured images, and the three-dimensional distance between the contact surfaces of the two parts is estimated to determine whether the assembly succeeds/fails. For this reason, the correct images need not be captured in advance, and it is possible to determine whether the assembly succeeds/fails by observing from a free orientation. In addition, since the three-dimensional distance between the assembled contact surfaces is used as an evaluation value, it is possible to easily change the precision to determine whether the assembly succeeds/fails. If the request for assembly precision is strict, a strict threshold is set. If the request is not so strict, the threshold value is set easily, thereby easily adjusting the threshold.

In the following description, processing of calculating the assembly evaluation value based on the difference in the three-dimensional positions and orientations between the two assembled parts and determining based on the calculated assembly evaluation value whether the assembly succeeds/fails will be described in detail below.

<2. Arrangement of Information Processing Apparatus>

Figure 1:
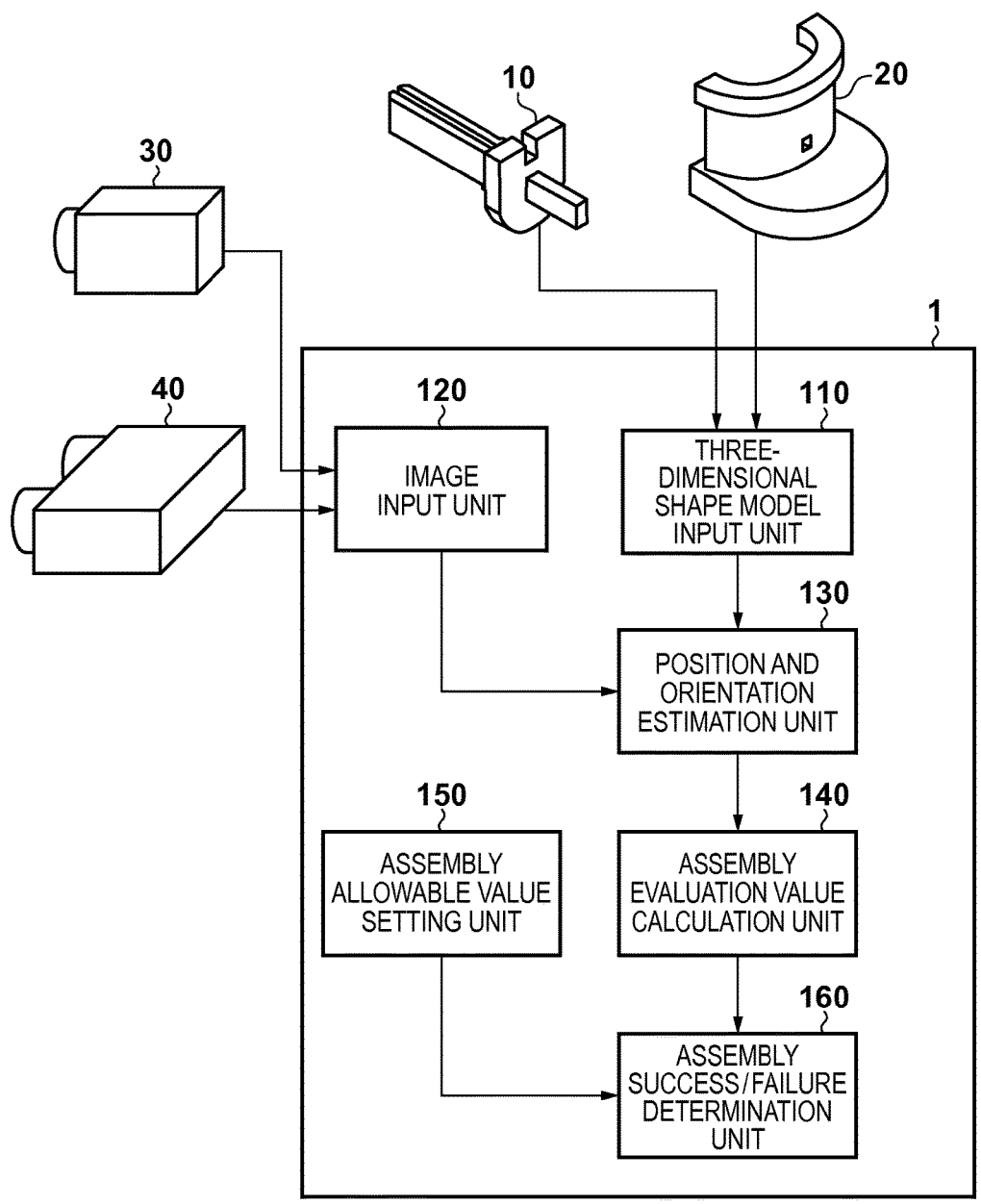
FIG. 1 is a view showing the arrangement of an information processing apparatus according to an embodiment of the present invention.

An example of the arrangement of an information processing apparatus 1 according to this embodiment will be described with reference to FIG. 1. The information processing apparatus 1 includes a three-dimensional shape model input unit 110, an image input unit 120, a position and orientation estimation unit 130, an assembly evaluation value calculation unit 140, an assembly allowable value setting unit 150, and an assembly success/failure determination unit 160.

Figure 3:
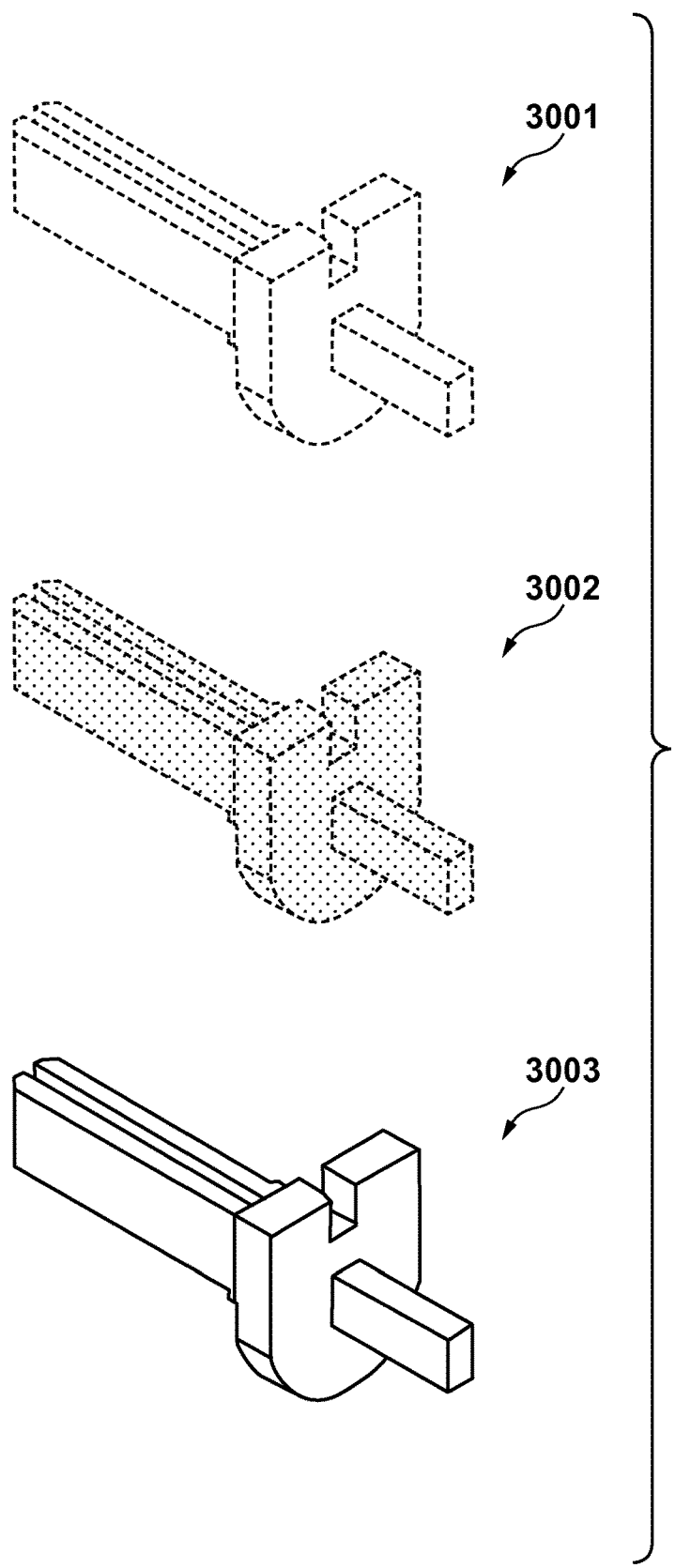
FIG. 3 is a view for explaining the constituent elements of a three-dimensional shape model according to an embodiment of the present invention.

The three-dimensional shape model input unit 110 inputs a three-dimensional shape model 10 representing the shape of the assembly source part and a three-dimensional shape model 20 representing the shape of the assembly destination part. In this embodiment, the three-dimensional shape model as indicated by 3003 in FIG. 3 is made from local three-dimensional plane information (to be referred to as a local plane feature hereinafter) on the object surface made of the three-dimensional position and the three-dimensional normal direction, as indicated by 3002 in FIG. 3 and local three-dimensional line segment information (to be referred to as a local line feature hereinafter) on the object contour made of the three-dimensional position and the three-dimensional line segment direction, as indicated by 3001 in FIG. 3. Note that when the three-dimensional shape model is simply called as a geometric feature, it represents both the local plane feature and the local line feature.

The shape information held as the three-dimensional shape model may be three-dimensional geometric information representing a target shape, but is not limited to any expression form. For example, for a set of simple three-dimensional points or a set of three-dimensional lines representing a ridge, the shape information may be expressed by another expression form such as shape information of a polygonal form expressed by a set of planes and lines each represented by three three-dimensional points. Alternatively, as indicated by the thick frame line or the hatched portion in each of the three-dimensional shape models 10 and 20 in FIG. 4, a portion serving as the contact plane in the assembly step is defined as a portion of interest. The portion is set so that the local plane feature and the local line feature belonging to the portion of interest can be referred to. The three-dimensional shape models 10 and 20 are stored in the three-dimensional shape model input unit 110 and are input to the position and orientation estimation unit 130.

A two-dimensional image capturing apparatus 30 is a camera for capturing a normal two-dimensional image. The two-dimensional image to be captured may be a grayscale image or a color image. In this embodiment, the two-dimensional image capture apparatus 30 outputs a grayscale image. The image captured by the two-dimensional image capturing apparatus 30 is input to the information processing apparatus 1 via the image input unit 120. The internal parameters such as the focal length, principal point, and lens distortion parameters of the camera are obtained with reference to the specifications of the apparatus to be used or are calibrated in advance by the method disclosed in "R. Y. Tsai, "A versatile camera calibration technique for high-accuracy 3D machine vision metrology using off-the-shelf TV camera and lenses", IEEE Journal of Robotics and Automation, vol. RA-3, no. 4, 1987".

A range image capturing apparatus 40 measures three-dimensional information of a point on an object surface serving as a measurement target. A range sensor for outputting a range image is used as the range image capturing apparatus 40. The range image is an image having information in which each pixel has depth information. In this embodiment, a one-shot active sensor for irradiating as the target the multi-slit line assigned with color IDs with different wavelengths and for performing distance measurement by the triangulation by capturing light reflected by the object with the camera is used as the range sensor. However, the range sensor is not limited to this. A Time-of-flight type sensor using the flight time of light may be used as the range sensor. Alternatively, the range sensor may be a passive sensor for calculating the depth of each pixel by triangulation from an image captured by a stereo camera. In addition, any range sensor which measures a range image may be used without departing from the scope of the present invention.

The range image measured by the range image capturing apparatus 40 is input to the information processing apparatus 1 via the image input unit 120. The optical axis of the range image capturing apparatus 40 matches that of the two-dimensional image capturing apparatus 30. The corresponding relationship between each pixel of the grayscale image output by the two-dimensional image capturing apparatus 30 and each pixel of the range image output from the range image capturing apparatus is known. However, the present invention is not limited to the case in which the grayscale image and the range image are obtained by same viewpoint.

For example, when an image capturing apparatus for capturing a grayscale image and an image capturing apparatus for capturing a range image are located at different positions with different orientations, the grayscale image and the range image may be captured from different viewpoints. In this case, it is assumed that the relative positions and orientations between the image capturing apparatuses are already known. A three-dimensional point group in the range image is projected onto the grayscale image to obtain the correspondence between the grayscale image and the range image. As far as the relative positions and orientations between the image capturing apparatuses for capturing a single object are known and the correspondence between these two images can be calculated, the positional relationship between the image capturing apparatuses is not limited to a specific one.

The position and orientation estimation unit 130 estimates the positions and orientations of the assembly source part and the assembly destination part based on the grayscale image and range images respectively captured by the two-dimensional image capturing apparatus 30 and the range image capturing apparatus 40 and the three-dimensional shape model 10 and three-dimensional shape model 20 held in the three-dimensional shape model input unit 110. The details of this processing will be described later.

The assembly evaluation value calculation unit 140 calculates an assembly evaluation value based on the position and orientation information estimated by the position and orientation estimation unit 130. In this embodiment, the three-dimensional distance between the portions of interest of the three-dimensional shape model 10 and the three-dimensional shape model 20 is calculated as the assembly evaluation value. More specifically, nearest pairs are calculated between local surface features belonging to the portions of interest of the two parts, three-dimensional distances between the nearest local surface features are calculated, and the maximum value of the nearest pairs is calculated as the assembly evaluation value. Note that the value calculated as the assembly evaluation value need not be obtained by the method described above. Any value which increases or decreases in accordance with the magnitude of a spatial shift between the portions of interest of the assembly source part and the assembly destination part can be used. The calculation method and expression of such a value are not limited to specific ones. For example, when a portion of interest is expressed by a polygon model, a distance between triangular meshes serving as the constituent elements of the polygon model may be used as an assembly evaluation value. Details of the assembly evaluation value calculation will be described later.

The assembly allowable value setting unit 150 sets a threshold for determining the failure or success for the evaluation value calculated by the assembly evaluation value calculation unit 140. As a threshold, an arbitrary accuracy can be set in accordance with the accuracy request of a user. A small threshold is set for strict determination, and a large threshold is set for rough determination. For example, if the assembly accuracy is required to fall within 300 μm, the assembly allowable value is set at 300 μm. Under this condition, if the distance between the assembly contact surfaces exceeds 300 μm, the assembly failure is determined.

When a CAD model or design drawings for the assembly source part 50 and the assembly destination part 60 are available and tolerance information of each portion can be obtained, the assembly evaluation value may be set based on the tolerance information. More specifically, assuming that if the assembly is correct, the shift amount between the assembly contact surfaces of the assembly source part 50 and the assembly destination part 60 falls within the sum of tolerances for the respective assembly contact portions, the sum of tolerances of the assembly contact portions of the two parts is set as the assembly evaluation value.

A user interface may be provided to set the threshold of the assembly evaluation value in the information processing apparatus 1, and the user interface may accept setting of the threshold by a user operation. The method of setting the threshold of the assembly evaluation value is not limited to a specific method. An arbitrary reference and an arbitrary method may be used to set a threshold without any problem. According to this embodiment, the threshold of the assembly evaluation value is set from the pieces of tolerance information of the assembly source part 50 and the assembly destination part 60. The details of threshold setting processing will be described later.

The assembly success/failure determination unit 160 determines based on the assembly evaluation value calculated by the assembly evaluation value calculation unit 140 and the threshold of the assembly evaluation value set by the assembly allowable value setting unit 150 whether the assembly succeeds or fails. The details of determination processing will be described later.

An example of the arrangement of the information processing apparatus 1 has been described above. Note that the information processing apparatus 1 incorporates a computer. The computer includes a main controller such as a CPU, a ROM (Read Only Memory), a RAM (Random Access Memory), an HDD (Hard Disk Drive), and the like. The computer may also include input/output units such as buttons, a display, and a touch panel, and a communication unit such as a network card. These constituent components are connected via buses and are controlled by causing the main controller to read out and execute programs stored in the memories.

<3. Assembly Success/Failure Determination Processing Executed by Information Processing Apparatus>

Figure 5:
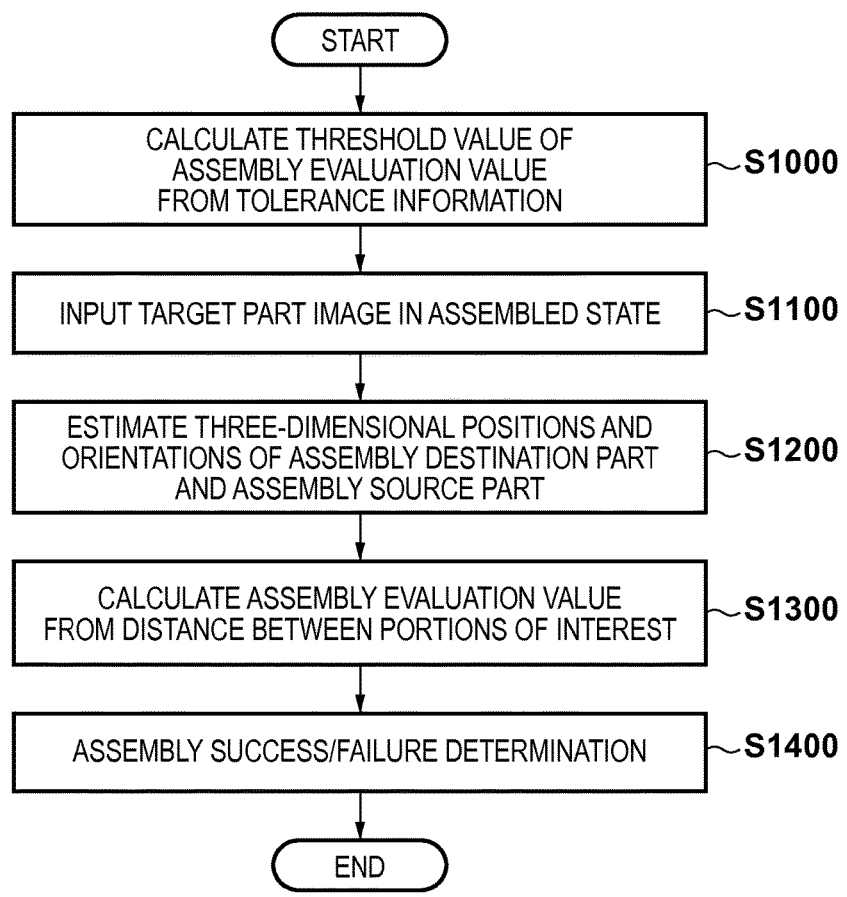
FIG. 5 is a flowchart showing the processing sequence of assembly inspection practiced by the information processing apparatus according to an embodiment of the present invention.

The processing sequence of the assembly success/failure determination according to this embodiment will be described below. FIG. 5 is a flowchart showing the processing sequence of the assembly success/failure determination executed by the information processing apparatus according to this embodiment.

(Step S1000)

In step S1000, the assembly allowable value setting unit 150 sets the threshold of the assembly evaluation value. The assembly allowable value setting unit 150 refers to all pieces of tolerance information corresponding to the assembly contact portions of the three-dimensional shape model 10 using the design drawings or CAD model of the assembly source part 50 and obtains the worst value of the tolerances in the portions as the tolerance of the assembly source part 50. Next, the assembly allowable value setting unit 150 refers to all pieces of tolerance information corresponding to the assembly contact portions of the three-dimensional shape model 20 using the design drawings or CAD model of the assembly destination part 60 and obtains the worst value of the tolerances in the portions as the tolerance of the assembly destination part 60. The assembly allowable value setting unit 150 sets the sum of the pieces of tolerance information obtained as described above as the threshold of the assembly evaluation value. When setting of the assembly allowable value setting is complete, processing in step S1000 ends, and the process advances to step S1100.

(Step S1100)

In step S1100, the image input unit 120 inputs the grayscale image and range image of an inspection target part obtained by assembling the two parts. First of all, the image input unit 120 obtains the grayscale image from the two-dimensional image capturing apparatus 30. Similarly, the image input unit 120 obtains the range image from the range image capturing apparatus 40. In this embodiment, assume that the range image stores a distance from the range image capturing apparatus 40 to the surface of the measurement target object. As described above, since the optical axis of the two-dimensional image capturing apparatus 30 matches the optical axis of the range image capturing apparatus 40, the correspondence between each pixel of the grayscale image and each pixel of the range image is known. When the input of the grayscale image and the range image is complete, processing in step S1100 ends, and the process advances to step S1200.

(Step S1200)

Figure 6:
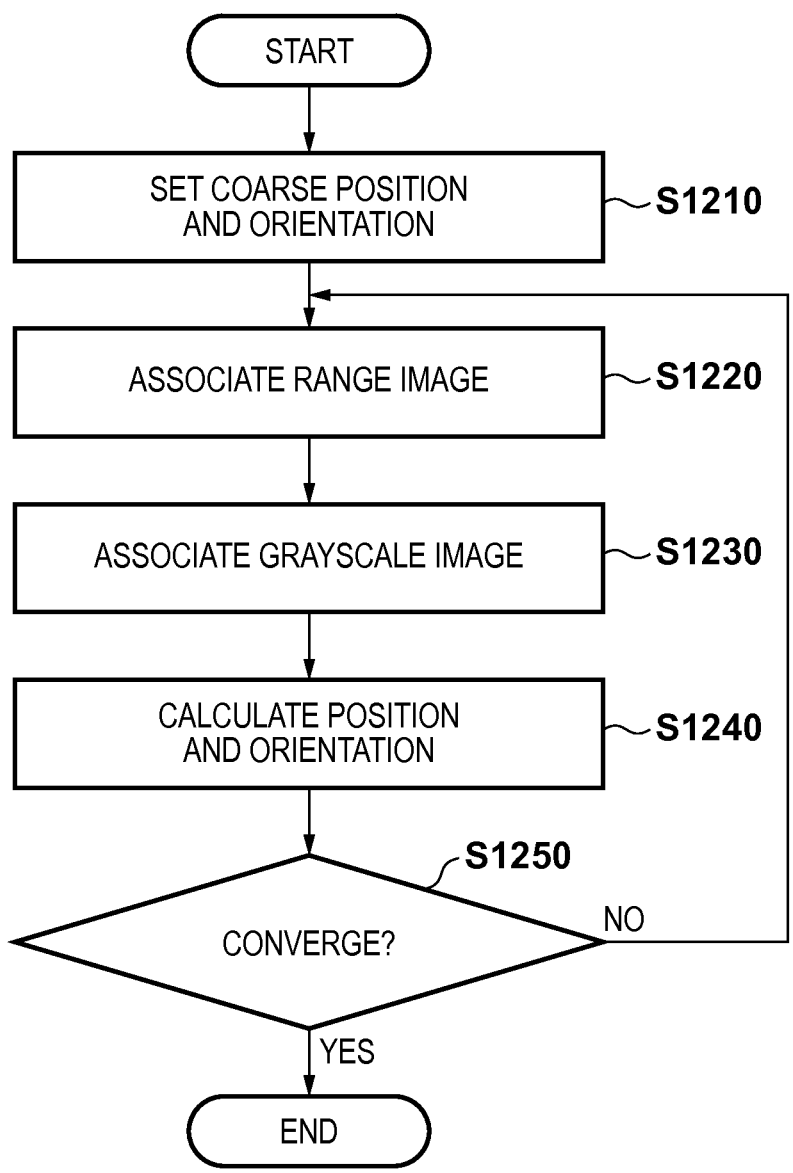
FIG. 6 is a flowchart showing the sequence of position and orientation estimation processing of an assembly source part and an assembly destination part in the assembly inspection practiced by the information processing apparatus according to an embodiment of the present invention.

Next, in step S1200, the position and orientation estimation unit 130 associates the grayscale image and range image input in step S1100 with the three-dimensional shape models 10 and 20 and estimates the positions and orientations of the assembly destination part and assembly source part based on the association result. The position and orientation estimation processing in step S1200 will be described below in detail with reference to the flowchart in FIG. 6.

[Step S1210]

First of all, in step S1210, the position and orientation estimation unit 130 inputs coarse values of the positions and orientations of the assembly source part and assembly destination part for the image capturing apparatus including the two-dimensional image capturing apparatus 30 and the range image capturing apparatus 40. In this embodiment, assuming that the coarse positions and orientations of the placed objects are known in advance, and these values are used as the coarse values.

The method of setting the coarse values of the positions and orientations is not limited to this. For example, the position and orientation estimation unit 130 may continuously perform measurements along the time axis, and the previous (preceding time) measurement value may be used as the coarse position and orientation. Alternatively, the speed or angular velocity of an object may be estimated by a time-series filter based on the measurement values of the past position and orientation. From the past position and orientation and the speed and acceleration, the current position and orientation may be predicted. Furthermore, images obtained by capturing a target object with various orientations may be held as a template, and template matching may be performed for an input image, thereby estimating the coarse position and orientation of the target object.

In addition, if another sensor can measure the position and orientation of the object, the output values from the sensor may be used as the coarse values of the position and orientation. For example, the sensor may be a magnetic sensor for measuring the position and orientation by causing a receiver attached to the object to detect a magnetic field transmitted by a transmitter. The sensor may be an optical sensor for measuring the position and orientation by capturing an object by a camera by which a marker located on the object is fixed to the scene. In addition, any sensor may be used if it can measure the positions and orientations of six degrees of freedom.

[Step S1220]

Next, in step S1220, the position and orientation estimation unit 130 associates the three-dimensional point group in the range image measured in step S1100 with the three-dimensional shape model 10 and the three-dimensional shape model 20 based on the coarse positions and orientations of the assembly source part and assembly destination parts, which are input in step S1210. The local surface features constituting the three-dimensional shape models are projected on the range image using the coarse positions and orientations of the respective objects and the internal parameters of the calibrated range image capturing apparatus 40. The distance points on the range image which correspond to the projected local surface features are held as three-dimensional points corresponding to the respective surfaces.

At this time, if an occlusion has occurred when the three-dimensional shape model 10 and the three-dimensional shape model 20 overlap each other on the image, an occlusion region is estimated, thereby suppressing the association in the occlusion region. More specifically, the relative positional relationship between the three-dimensional shape models 10 and 20 is calculated based on their coarse positions and orientations, and the positional relationship between the two models with respect to the image capturing apparatuses is determined. By this operation, the occlusion region is coarsely estimated, and the association between the models and the images is suppressed in the region where the occlusion has occurred.

[Step S1230]

Next, in step S1230, the position and orientation estimation unit 130 associates an edge on the grayscale image with the three-dimensional shape model. As in step S1220, the local line features constituting the three-dimensional shape models are projected on the image using the coarse positions and orientations of the respective objects and the internal parameters of the calibrated two-dimensional image capturing apparatus 30. The position and orientation estimation unit 130 associates the edge detected on the image with the local line feature in the three-dimensional shape model. If a plurality of edges are detected in correspondence with the respective local line features, the nearest edge on the image out of the plurality of detected edges is associated with the projected local line.

[Step S1240]

Next, in step S1240, the position and orientation estimation unit 130 calculates the positions and orientations of the assembly destination part and the assembly source part based on the correspondence data between the edge on the grayscale image corresponding to each line segment in the three-dimensional shape model detected in step S1230 and the three-dimensional point in the range image which corresponds to each surface in the three-dimensional shape model calculated in step S1220. In this step, based on the calculated correspondence data, linear simultaneous equations are solved so that the error between the measurement data and the three-dimensional shape model becomes minimum, thereby updating the positions and orientations.

Since the distance on the image and the distance in the three-dimensional space have different measures, a contribution is localized to one of the measurement data by simply solving the simultaneous equations. For this reason, this embodiment performs optimization based on the maximum likelihood estimation described in "Tateno, Kotake, and Uchiyama, "A Model Fitting Method Using Intensity and Range Images for Bin-Picking Applications", Journal of IEICE D, Information and System, J94-D(8), 1410-1422, 2011." This makes it possible to perform position and orientation estimation based on identical measures.

The position and orientation estimation method based on the maximum likelihood estimation is irrelevant to the scope of the present invention, and a detailed description of this processing will be omitted. Please refer to the above literature for further detail. Note that the method of calculating the position and orientation of the measurement target object is not limited to the maximum likelihood estimation described above, but the repeated calculation based on the Levenberg-Marquardt method may be used. Alternatively, the steepest descent method as a simpler method may be used. In addition, any other nonlinear optimization calculation method such as the conjugate gradient method or the ICCG method may be used.

[Step S1250]

Next, in step S1250, the position and orientation estimation unit 130 determines whether the position and orientation updated in step S1240 converges, that is, whether the repeated calculation is necessary. More specifically, the position and orientation estimation unit 130 determines that the position and orientation converges when a correction value is nearly zero or when the difference between the square sum of error vectors before correction and that after correction is nearly zero. If no convergence is obtained (NO in step S1250), the process returns to step S1120 to perform the position and orientation estimation processing again using the updated position and orientation. However, if the convergence is obtained (YES in step S1250), this processing ends. The final estimation values of the relative positions and orientations between the image capturing apparatuses and the measurement target objects are decided.

(Step S1300)

Figure 7:
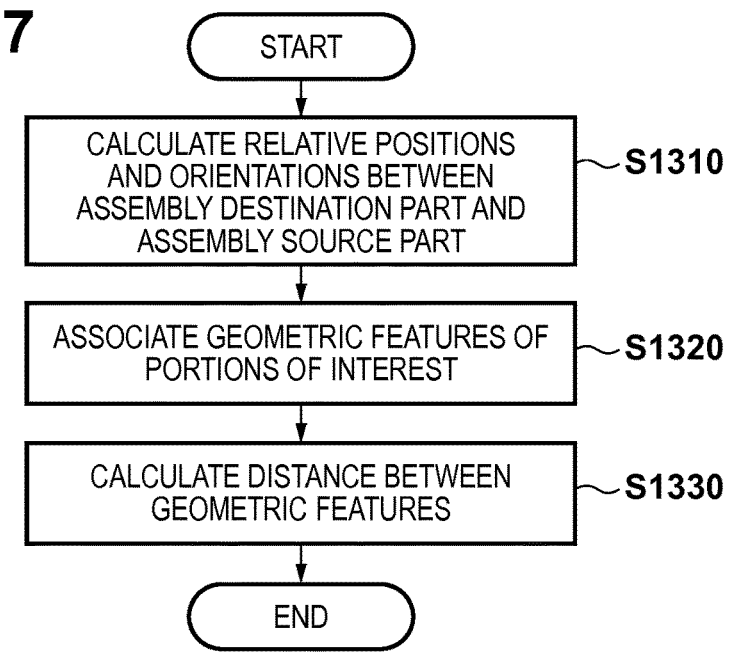
FIG. 7 is a flowchart showing the processing sequence of evaluation value calculation for determining whether assembly succeeds/fails in the assembly inspection according to an embodiment of the present invention.

Next, in step S1300, the assembly evaluation value calculation unit 140 calculates the assembly evaluation value based on the three-dimensional shape models 10 and 20 and the positions and orientations estimated in step S1200. The assembly evaluation value calculation processing in step S1300 will be described below in detail with reference to the flowchart of FIG. 7.

[Step S1310]

First of all, in step S1310, the assembly evaluation value calculation unit 140 calculates the relative positions and orientations between the two parts based on the position and orientation of the assembly source part 50 and the position and orientation of the assembly destination part 60, which are estimated in step S1200.

[Step S1320]

Next, in step S1320, the assembly evaluation value calculation unit 140 calculates a nearest pair between the local surface feature belonging to the portion of interest of the three-dimensional shape model 10 and the local surface feature belonging to the portion of interest of the three-dimensional shape model 20 based on the relative positions and orientations between the models. As a method of nearest feature association method between three-dimensional points with a normal, an association method in range image alignment as in "Takeshi Oishi, Atsushi Nakazawa, and Katsushi Ikeuchi, "Fast Simultaneous Alignment of Multiple Range Images Using Index Images", Journal of IEICE, Vol. J89-D No. 3, pp. 513-521, March 2006" is used.

[Step S1330]

Next, in step S1330, the assembly evaluation value calculation unit 140 calculates the distance between the nearest pair of local surface features. A distance d between the local planes of the local surface features can be calculated by:

$$d=|(P_b-P_a)\cdot Pn| \quad (1)$$

where $P_a$ ($P_{ax}$, $P_{ay}$, $P_{az}$) is the point position of the local surface feature of the three-dimensional shape model 10, $N_a$ ($N_{ax}$, $N_{ay}$, $N_{az}$) is the normal direction, and $P_b$ ($P_{bx}$, $P_{by}$, $P_{bz}$) is the point position of the local surface feature of the three-dimensional shape model 20.

The distances d are calculated from all the associated pairs, and the maximum distance d out of all the distances d is calculated as the assembly evaluation value.

When the above assembly evaluation value calculation is complete, processing in step S1330 ends, and the process advances to step S1400.

(Step S1400)

Next, in step S1400, the assembly success/failure determination unit 160 determines based on the assembly evaluation value calculated in step S1300 and the threshold of the assembly evaluation value which is set in step S1000 whether the assembly succeeds or fails. If the assembly evaluation value calculated in step S1300 is smaller than the set threshold, the unit 160 determines that the assembly succeeds; otherwise, the unit 160 determines that the assembly fails. When the assembly success/failure determination is complete, this processing ends. The assembly success/failure is finally determined.

As described above, according to this embodiment, the three-dimensional distance between the assembly contact portions is calculated as the assembly evaluation value based on the three-dimensional positions and orientations of the assembly source part and the assembly destination part, which are estimated from the captured image of the assembled part serving as the inspection target. The assembly evaluation value is compared with the threshold of the assembly evaluation value which is set in advance to determine whether the assembly succeeds or fails.

According to this embodiment, determination is made based on the three-dimensional distance of the contact surfaces of the two parts. For this reason, the correct images need not be captured in advance, and it can be determined whether the assembly succeeds or fails by observing each part from a free orientation. In addition, this embodiment has an advantage in that the degree of strictness of the assembly success/failure determination can be adjusted using an integral value not associated with the observation viewpoint.

As described above, according to this embodiment, even if an inspection part is captured at an orientation different from that during learning, the assembly success/failure determination can be stably performed. In addition, without capturing a master image in advance as a learnt image, assembly success/failure determination can be performed.

Second Embodiment: Application Case of Information Processing Apparatus

Figure 8:
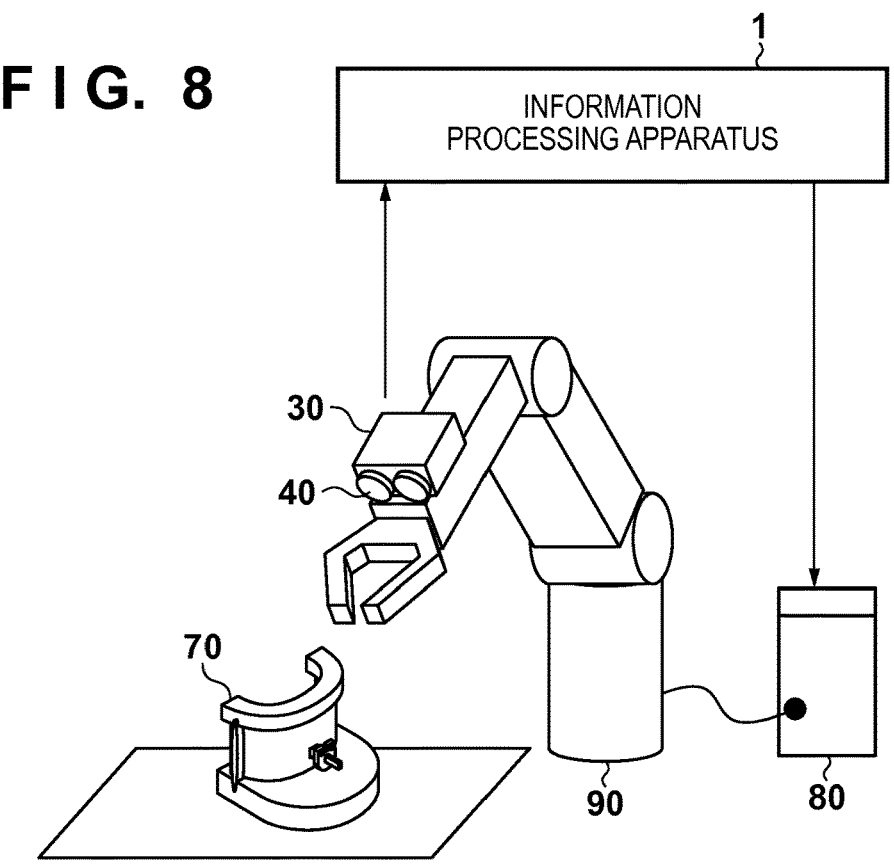
FIG. 8 is a view showing an example of the arrangement of a robot system according to an embodiment of the present invention.

As shown in FIG. 8, a suitable application case of an information processing apparatus 1 according to the present invention is a case in which the assembly of a part 70 assembled by an industrial robot 90 is determined to succeed or fail based on a two-dimensional image obtained by a two-dimensional image capturing apparatus 30 and a range image captured by a range image capturing apparatus 40. An application example of the information processing apparatus 1 as another embodiment of the present invention will be described with reference to FIG. 8 below.

FIG. 8 shows an example of the arrangement of a robot system for performing part assembly processing using the information processing apparatus 1 and the robot 90. The robot 90 is a robot which is controlled by a robot controller 80 functioning as a controller and performs an object gripping and assembly processing and the like by moving its fingertip to a designated position. The assembled part 70 is constituted by an assembly source part and an assembly destination part. The two-dimensional image capturing apparatus 30 generally includes a camera for capturing a two-dimensional image. The range image capturing apparatus 40 includes a range sensor for measuring a distance to the object surface and is arranged at a position where a measurement target object such as the fingertip of the industrial robot arm can be captured.

The information processing apparatus 1 estimates the positions and orientations of the assembly source and destination parts constituting the assembled part 70 based on the two-dimensional image obtained from the two-dimensional image capturing apparatus 30 and the range image obtained from the range image capturing apparatus 40. The information processing apparatus 1 determines based on the estimated positions and orientations whether the assembly of the assembled part succeeds or fails. If the assembly failure is determined, the robot is controlled to grip and move the assembled part so as to remove it from the process. Countermeasures for the assembly failure are not limited to the above case, but can be the stop of the process, generation of a warning, reassembly, and the like. The selection of the countermeasure is not limited to a specific one.

As described above, an information processing system (robot system) including the information processing apparatus and the controller (robot controller) for controlling the assembly operation based on the assembly success/failure determination result by the information processing apparatus can be applied to the present invention. Note that the controller (robot controller) may be integrated with the information processing apparatus.

As described above, according to this embodiment, the robot system can determine whether the assembly of the assembled part succeeds or fails. The failed part can be excluded so as not to supply it to the normal process.

[First Modification] (Assembly Evaluation Value Variation: Position and Orientation Difference)

In the above embodiments described above, the assembly success/failure determination is made based on the assembly evaluation value calculated from the contact portions between the three-dimensional shape model 10 and the three-dimensional shape model 20. However, the assembly evaluation value calculation method is not limited to this. For example, the assembly evaluation value may be calculated based on the difference in three-dimensional position and orientation between the assembly destination part and the assembly source part. In this case, the positions and orientations between the parts when the assembly destination part 60 and the assembly source part 50 are correctly assembled are calculated as ideal values. Alternatively, allowable values for the difference between the three-dimensional positions of the two parts and the three-dimensional angle difference between the two parts are set as assembly allowable values in advance. The positions and orientations between the assembly destination part and the assembly source part are calculated from the images serving as the inspection targets, and the differences between the calculated positions and orientations and the ideal value positions and orientations between the parts are calculated. The assembly success/failure is determined based on whether the calculated position difference and the calculated angle difference are equal to or smaller than the thresholds. At this time, the success/failure determination method is not limited to the method of checking both the position difference and the angle difference. The assembly success/failure determination may be made based on only one of the position difference and the angle difference.

As described above, the assembly evaluation value is calculated from the positions and orientations between the assembly destination part and the assembly source part to perform assembly success/failure determination without setting the information of contact portions of the three-dimensional shape model.

[Second Modification] (Assembly Evaluation Value Calculation Variation: Residue on Image by Ideal Values Between Parts)

In the above embodiments, the assembly success/failure determination is made based on the assembly evaluation value calculated based on the three-dimensional distance between the contact portions of the three-dimensional shape model 10 and the three-dimensional shape model 20. The assembly evaluation value calculation method is not limited to this. For example, a three-dimensional model shape assuming that the assembly is correctly performed may be prepared, and the assembly evaluation value may be calculated from the difference between the captured image and the three-dimensional shape model, that is, the residue on the image. In this case, the positions and orientations obtained when the assembly destination part 60 and the assembly source part 50 are correctly assembled are given as the ideal values of the positions and orientations between the parts.

In the position and orientation estimation processing of step S1200, the position and orientation of one of the three-dimensional shape model 10 and the three-dimensional shape model 20 is estimated. The position and orientation of the model which is not estimated is calculated using the position and orientation information of the estimated model and the ideal values of the positions and orientations between the parts. Subsequently, the residue between each surface of the three-dimensional shape model and the three-dimensional point in the range image is calculated based on the range image and the three-dimensional shape model used to calculate the position and orientation using the ideal values.

When the assembly source part 50 and the assembly destination part 60 are correctly assembled, the ideal values of the positions and orientations between the parts and the actual values match each other. For this reason, the residue between the part image on the range image and the three-dimensional shape model is made small. To the contrary, when the two parts are not correctly assembled, the ideal positions and orientations between the parts are different from the actual ones. The residue is observed as a large value. The median of the residue between the three-dimensional shape model and the image is calculated as the assembly evaluation value. By using the calculated assembly evaluation value, the assembly success/failure determination is performed in step S1400.

Note that in this case, since at the stage of step S1200 the assembly evaluation value calculation is complete, the assembly evaluation value calculation processing based on the difference between the models in step S1300 is not performed. A method of calculating the residue or its statistic amount measured as the assembly evaluation value is not limited to a specific one as long as the difference between the three-dimensional shape model and the captured image can be detected.

In the second modification as described above, the position and orientation of one of the first part (assembly source part 50) and the second part (assembly destination part 60) to which the first part is assembled is estimated based on the image including the first part and the second part. Then, based on the position and orientation of an assembly successful state held in advance with the position and orientation of the one of the first part and the second part, the position and orientation of the other is calculated. An evaluation value for evaluating the assembly state is calculated based on the image and the shape model of the part corresponding to the other calculated position and orientation. In addition, the assembly success/failure determination is made based on this evaluation value.

As described above, the position and orientation of the assembly destination part 60 or the assembly source part 50 is calculated from the image. The difference between the captured image and the three-dimensional model shape assuming that the assembly is successfully performed is calculated. The assembly success/failure determination can be performed without estimating the positions and orientations of both the assembly destination part and the assembly source part.

[Third Modification] (Assembly Evaluation Value Calculation Variation: Residue on Image of Assembled Part)

In the above modifications, the assembly evaluation value is calculated using the three-dimensional shape models of the assembly source part 50 and the assembly destination part 60 and the ideal values of the positions and orientations between these two parts when these parts are assembled. However, the determination may be performed using one three-dimensional shape model of the assembled part 70 in place of the two three-dimensional shape models of the assembly source part 50 and the assembly destination part 60. In this case, a portion of interest for assembly success/failure determination is designated in advance in the three-dimensional shape model of the assembled part 70. The portion of interest is preferably a portion near the assembly contact portion. Note that all or only part of the model may be used as the portion of interest. The method of setting the portion of interest is not limited to a specific one as long as the assembly success/failure determination is correctly performed.

The basic processing sequence is the same as those of the above modifications. In step S1200, the position and orientation estimation unit 130 estimates the position and orientation of the assembled part 70. A residue between the three-dimensional point in the range image and each surface belonging to the portion of interest in the three-dimensional shape model is calculated. When the assembled part is correctly assembled, the three-dimensional shape model of the assembled part 70 matches the image on the actual image, and the residue is made small. The median of this residue is used as the assembly evaluation value to perform assembly success/failure determination.

In the third modification as described above, the position and orientation of the assembled part including the first part and the second part is estimated based on an image including the first part (assembly source part 50) and the second part (assembly destination part 60) to which the first part is assembled. The evaluation value for evaluating the assembled state is calculated based on the image and the shape model of the assembled part. In addition, assembly success/failure determination is made based on this evaluation value.

As described above, assembly success/failure determination is made using only the three-dimensional shape model of the assembled part 70. Only one three-dimensional shape model is held and used for the position and orientation estimation, thereby allowing the assembly success/failure determination.

[Fourth Modification] (Automatic Assembly Allowable Value Setting Method: Learning Based Method Using Accurate Image Input)

In the above embodiments, the assembly allowable value serving as the threshold of the assembly evaluation value is manually set by the user. However, the method of setting the assembly allowable value is not limited to the method of giving a fixed value. For example, a correct image given in advance is used as a clue, and an assembly allowable value may be set automatically. In this case, as the automatic assembly allowable value setting processing, the following processing is given.

First of all, a correct image obtained by capturing a part in which the assembly source part and the assembly destination part are correctly assembled is prepared. Processing from step S1100 to step S1300 is performed for the correct image. The assembly evaluation value calculated for the correct image is set as the threshold of the assembly evaluation value. At this time, the calculated assembly evaluation value is not directly set, but a predetermined bias is added to the calculated assembly evaluation value to adjust the degree of strictness for the assembly success/failure determination.

By performing the above processing, the assembly determination can be performed without setting the assembly allowable value in advance by the user. At this time, unlike in the technique disclosed in Japanese Patent Laid-Open No. 2008-170331, the determination can advantageously be performed by capturing the inspection target from a free viewpoint without capturing the image of the inspection target from the same viewpoint as that of the correct image.

[Fifth Modification] (Position and Orientation Estimation May be Performed by Matching)

In the above embodiments and modifications, the nonlinear minimum square method has been exemplified as the position and orientation estimation method based on the association of the image and the geometric feature. However, the position and orientation estimation method of the inspection target object in the information processing apparatus of the present invention is not limited to the above method. For example, the position and orientation may be calculated by matching based on the association between the three-dimensional shape model and the image. That is, in a predetermined range centered on the coarse position and orientation, a large number of positions and orientations may be generated so as to entirely cover the values of the six degrees of freedom, and the degree of matching between the grayscale and range images and the geometric features which can be observed in the generated positions and orientations may be evaluated, thereby calculating the positions and orientations of the assembly source part 50 and the assembly destination part 60.

More specifically, as the generation of positions and orientations to be searched, all combinations of six degrees of freedom of the positions and orientations are generated centered on the values of input positions and orientations as coarse values. At this time, the maximum width, step width of the positions entirely covered and the maximum width and step width of the orientations are not limited to specific ones. In this modification, the positions and orientations to be searched are generated, assuming that the maximum width of the position is equal to the size of each of the assembly source part 50 and the assembly destination part 60, the maximum width of the orientation is 90°, the step width of the position is 1 mm, and the step width of the orientation is 1°.

Next, for each generated position and orientation, the geometric feature observed at this position and orientation, the three-dimensional point group in the range image, and the edge on the grayscale image are associated with each other. Distances between the three-dimensional point group and the local surface feature of the range image and between the edge and local line feature of the grayscale image are calculated as the evaluation values representing the degrees of matching. The above processing is performed for all the generated positions and orientations to search for the values of the position and orientation corresponding to the highest evaluation value. The positions and orientations corresponding to the highest evaluation value are output as the positions and orientations of the assembly source part 50 and the assembly destination part 60. The assembly evaluation value is calculated using the calculated positions and orientations in step S1300, and the assembly success/failure determination is performed.

As described above, the method of estimating the positions and orientations of parts to be used for assembly inspection is not limited to the method based on the minimum square method. The calculation method is not specifically limited as long as the positions and orientations of the assembly destination part and the assembly source part can be calculated. Any method may be used.

[Sixth Modification] (Only Range Image or Grayscale Image May be Used)

The above embodiments have exemplified the case in which the grayscale image and the range image are captured. However, the information processing apparatus according to the present invention is not limited to the case in which both the grayscale image and the range image are captured. For example, the information processing apparatus according to the present invention is applicable to the case in which only the range image is captured. In this case, the information processing apparatus according to this modification has an arrangement obtained by excluding the two-dimensional image capturing apparatus 30 from the arrangement of FIG. 1. Position and orientation estimation processing of this modification is the same as those of the above embodiments and modifications except that input processing of the grayscale image in step S1100 is omitted, and the association processing between the grayscale image and the local line feature in step S1230 is omitted.

Similarly, when capturing only the grayscale image, the information processing apparatus according to the present invention is applicable. In this case, the arrangement is the same as those of the above embodiments except that the range image capturing apparatus 40 is omitted from the arrangement in FIG. 1, input processing of the range image in step S1100 is omitted, and the association processing between the range image and the geometric feature in step S1220 is omitted. In this manner, the assembly evaluation value is calculated in step S1300 using the calculated position and orientation, and assembly success/failure determination is performed.

As described above, the present invention is not limited to the case in which both the grayscale image and the range image are obtained. The information processing apparatus according to the present invention is applicable as far as one of these images is obtained.

Effect of Each Embodiment and Each Modification

According to the first embodiment, when the determination is made based on the three-dimensional distance of the contact surfaces of the two parts, the assembly success/failure determination can be performed by observing the part from a free orientation without capturing the correct image in advance. In addition, the degree of strictness of the assembly success/failure determination can advantageously and easily be adjusted as an integral value regardless of the observation viewpoint.

According to the second embodiment, by applying the information apparatus according to the present invention, the robot system can determine whether the assembled part is correctly assembled. This makes it possible not to supply the failed part in the normal process.

According to the first modification, the assembly evaluation value is calculated from the positions and orientations between the assembly destination part 60 and the assembly source part 50. The assembly success/failure determination can be made without setting the information of the contact portion of the three-dimensional shape model.

According to the second modification, the position and orientation of the assembly destination part 60 or the assembly source part 50 is calculated from the image. The difference between the captured image and the three-dimensional model shape assuming the state in which the assembly is correctly performed is calculated. The assembly success/failure determination can be made without estimating the positions and orientations of both the assembly destination part and the assembly source part.

According to the third modification, the assembly success/failure determination is made using only the three-dimensional shape model of the assembled part 70. The assembly success/failure determination can be made by only holding one three-dimensional shape model and performing the position and orientation estimation using this three-dimensional shape model.

According to the fourth modification, the correct image obtained by capturing the part in which the assembly is correctly performed is prepared, and the threshold for assembly success/failure determination is set based on the assembly evaluation value calculated from the correct image. This makes it possible to perform assembly success/failure determination without setting the assembly allowable value in advance by the user. At this time, unlike in the technique disclosed in Japanese Patent Laid-Open No. 2008-170331, the inspection target image need not be captured from the same viewpoint as that of the correct image. The inspection target can be captured from a free viewpoint, and the determination can advantageously be performed.

According to the fifth modification, as the method of estimating the position and orientation of the part, the assembly evaluation value can be calculated using the position and orientation by matching based on the association between the three-dimensional shape model and the image.

According to the sixth modification, the position and orientation is performed using only the grayscale image or the range image. The assembly success/failure determination can be made using only one of these two images.

OTHER MODIFICATIONS

The description of the present invention has exemplified a model including the local surface feature and the local line feature as the pieces of three-dimensional shape model information of the assembly source part 50 and the assembly destination part 60. Another expression method may be used as the three-dimensional shape model. For example, a three-dimensional shape model may be expressed using polygons each made from three points, three sides, and one plane. A three-dimensional shape model may be expressed as a set of simple three-dimensional points. A method of expressing a three-dimensional shape in a parametric by using a combination of implicit functions may be used. The method of expressing the three-dimensional shape model is not limited to a specific one as far as the model is compatible with the shape of the assembly destination part 60 or the assembly source part 50.

The two-dimensional image capturing apparatus 30 is not limited to a camera for outputting a grayscale image. Any other method may be used as far as the target image can be obtained. For example, the image may be a grayscale image or color image.

The range image capturing apparatus 40 need not be limited to a one-shot active apparatus for performing distance measurement by triangulation such that multislit lines having color IDs of different wavelengths irradiate a target and capturing the reflected light with the camera. Any other method may be used. For example, a passive apparatus for calculating the depth of each pixel by triangulation from an image captured by a stereo camera may be used. The pattern emission projector is not limited to the liquid crystal projector. Any other method can be used as far as pattern light projection can be performed. For example, a projector using a DMD (Digital Mirror Device) or LCOS may be used.

In the position and orientation decision, the method of calculating the position and orientation of the assembly destination part 60 or the assembly source part 50 is not limited to the Gauss-Newton method. For example, the Levenberg-Marquardt method whose calculation is more robust may be used. Alternatively, the steepest descent method as a simpler method may be used. Any other nonlinear optimization calculation method such as the conjugate gradient method or ICCG method may be used. Any method other than the position and orientation estimation method based on the optimization calculation may be used. That is, a large number of positions and orientations may be generated so as to entirely cover the values of the six degrees of freedom in a predetermined range centered on the coarse positions and orientations, and the degree of matching between the grayscale and range images and the geometric features which can be observed in the respective positions and orientations, thereby estimating the position and orientation.

The position and orientation decision has exemplified the case in which the position and orientation is estimated using both the grayscale image and the range image. The present invention is also applicable when the position and orientation estimation is performed using only the grayscale image or the range image.

The assembly evaluation value calculation has exemplified the case in which the three-dimensional distance between the portions of interest of the three-dimensional shape models 10 and 20 is calculated as the assembly evaluation value. The assembly evaluation value may be calculated by another method. For example, the differences between the ideal values and the observation values of the relative positions and orientations of the three-dimensional shape models 10 and 20 may be used as the assembly evaluation values. Alternatively, the assembly evaluation value may be calculated based on the residue between the three-dimensional shape model and the captured image. A value calculated by any method may be used as the assembly evaluation value as far as the value is a value changing in accordance with the shift amount between the assembly portions of the assembly source part 50 and the assembly destination part 60. The calculation method is not limited to any method.

The assembly allowable value setting has exemplified the case in which a value calculated based on the tolerance information which can be referred to from the design drawings or CAD models of the assembly source part 50 and the assembly destination part 60 is set as the threshold of the assembly evaluation value. The assembly allowable value setting is not limited to this. For example, the user interface for allowing the user to input a value may be arranged, and the user may set the assembly allowable value. Alternatively, the correct image obtained by capturing the correct assembly result is input in advance, and the threshold may be calculated using this correct image.

The present invention allows stable assembly success/failure determination even when the inspection part is captured at an orientation different from that at the time of learning.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-254486, filed Dec. 9, 2013, which is hereby incorporated by reference herein in its entirety.

What is claimed is:

1. An information processing apparatus comprising:
one or more processors; and
a memory coupled to the one or more processors, the memory having stored thereon instructions which, when executed by the one or more processors, cause the apparatus to:
input a shape model of a first part and a shape model of a second part;
input an image including the first part and the second part to which the first part is assembled;
estimate each of positions and orientations of the first part and the second part, by associating the first part and the second part, in the input image, with the shape model of the first part and the shape model of the second part, respectively;
determine a first geometric feature in a portion of interest of the shape model of the first part and a second geometric feature in a portion of interest of the shape model of the second part, wherein the second geometric feature is associated with the first geometric feature;
calculate a distance between the first geometric feature and the second geometric feature;
calculate an evaluation value for evaluating an assembled state of the first part and the second part based on the distance between the first geometric feature and the second geometric feature;
determine assembly success/failure of the first part with respect to the second part based on the evaluation value; and
control an assembly operation based on a result of the assembly success/failure determination.

2. The information processing apparatus according to claim 1, wherein the instructions, when executed by the one or more processors, further cause the apparatus to set an allowable value of the evaluation value,
wherein the assembly success/failure determination is determined based on comparison between the evaluation value and the allowable value.

3. The information processing apparatus according to claim 2, wherein tolerance information of contact portions of the first part and the second part from the shape model of the first part and the shape model of the second part is obtained, and the allowable value is set based on the tolerance information.

4. The information processing apparatus according to claim 2, wherein the allowable value is set based on images obtained by capturing the first part and the second part in the assembly successful state.

5. The information processing apparatus according to claim 1, wherein the image includes at least one of a grayscale image and a range image.

6. A method for controlling an information processing apparatus, the method comprising steps of:
inputting a shape model of a first part and a shape model of a second part;
inputting an image including the first part and the second part to which the first part is assembled;
estimating each of positions and orientations of the first part and the second part, by associating the first part and the second part, in the input image, with the shape model of the first part and the shape model of the second part, respectively;
determining a first geometric feature in a portion of interest of the shape model of the first part and a second geometric feature in a portion of interest of the shape model of the second part, wherein the second geometric feature is associated with the first geometric feature;
calculating a distance between the first geometric feature and the second geometric feature;
calculating an evaluation value for evaluating an assembled state of the first part and the second part based on the distance between the first geometric feature and the second geometric feature; and
determining assembly success/failure of the first part with respect to the second part based on the evaluation value; and
controlling an assembly operation based on a result of the assembly success/failure determination.

7. A non-transitory computer-readable storage medium storing a computer program for causing a computer to execute steps of a method for controlling an information processing apparatus, the steps comprising:
inputting a shape model of a first part and a shape model of a second part;
inputting an image including the first part and the second part to which the first part is assembled;
estimating each of positions and orientations of the first part and the second part, by associating the first part and the second part, in the input image, with the shape model of the first part and the shape model of the second part, respectively;
determining a first geometric feature in a portion of interest of the shape model of the first part and a second geometric feature in a portion of interest of the shape model of the second part, wherein the second geometric feature is associated with the first geometric feature;
calculating a distance between the first geometric feature and the second geometric feature;
calculating an evaluation value for evaluating an assembled state of the first part and the second part based on the distance between the first geometric feature and the second geometric feature; and
determining assembly success/failure of the first part with respect to the second part based on the evaluation value; and
controlling an assembly operation based on a result of the assembly success/failure determination.

* * * * *